United States Patent
Thakkar

(10) Patent No.: US 10,367,890 B2
(45) Date of Patent: Jul. 30, 2019

(54) MAINTAIN SINGLE SESSION WITH A SINGLE APPLICATION ACROSS MULTIPLE CLIENTS

(71) Applicant: Oracle International Corporation, Redwood Shores, CA (US)

(72) Inventor: Dhiraj D. Thakkar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 146 days.

(21) Appl. No.: 15/473,493

(22) Filed: Mar. 29, 2017

(65) Prior Publication Data
US 2018/0077244 A1 Mar. 15, 2018

Related U.S. Application Data

(60) Provisional application No. 62/394,648, filed on Sep. 14, 2016.

(51) Int. Cl.
*H04L 29/08* (2006.01)
(52) U.S. Cl.
CPC ............. *H04L 67/14* (2013.01); *H04L 67/02* (2013.01)
(58) Field of Classification Search
CPC .................................. H04L 67/02; H04L 67/14
See application file for complete search history.

(56) References Cited

U.S. PATENT DOCUMENTS

| 2013/0254262 A1* | 9/2013 | Udall | H04L 67/42 709/203 |
| 2014/0258547 A1* | 9/2014 | Scavo | H04L 29/06 709/227 |
| 2017/0093837 A1* | 3/2017 | Watanabe | H04L 63/08 |

OTHER PUBLICATIONS

Kerberos (see Wikipedia) (https://en.wikipedia.org/wiki/Kerberos_(protocol))—8 pages—date: Dec. 1, 2016.
Single Sign-On technologies (see Wikipedia), e.g., XOpen SSO PAM. (https://www.uoguelph.ca/ccs/security/internet/single-sign-sso/benefits)—2 pages.
Pluggable Authentication Module (PAM) (-see Wikipedia article for references at the bottom-), e.g., JaaS. (https://en.wikipedia.org/wiki/Java_Authentication_and_Authorization_Service).—5 pages—date: May 22, 2012.

* cited by examiner

*Primary Examiner* — Kim T Nguyen
(74) *Attorney, Agent, or Firm* — Trellis IP Law Group, PC

(57) ABSTRACT

A system and method for facilitating interaction between computing sessions. An example method provides for first web application to use a same session as a user session of a second web application that is external to the first web application. The first web application can replicate portions of a session Uniform Resource Locator (URL) and submit one or more modified URLs to the second web application. The second web application then handles communications with both the browser and the first web application as a single session. In a particular embodiment, the second web application need not be modified to handle this type of 3-way single session.

20 Claims, 8 Drawing Sheets

MAINTAIN SINGLE SESSION WITH A SINGLE APPLICATION ACROSS MULTIPLE CLIENTS

CROSS REFERENCES TO RELATED APPLICATIONS

This application claims priority from U.S. Provisional Patent Application Ser. No. 62/394,648, entitled MAINTAIN SINGLE SESSION WITH A SINGLE APPLICATION ACROSS MULTIPLE CLIENTS, filed on Sep. 14, 2016 which is hereby incorporated by reference as if set forth in full in this application for all purposes.

This application is related to the following application, U.S. Provisional Application Ser. No. 62/395,341, entitled SYSTEM FOR PROCESS CLOUD SERVICE, filed on Sep. 15, 2016, which is hereby incorporated by reference as if set forth in full in this application for all purposes.

BACKGROUND

The present application relates to computing, and more specifically to software, User Interfaces (UIs), methods, and accompanying systems for facilitating optimizing the use of a particular computing session of a software application.

Systems and methods involving use of computing sessions are employed in various demanding applications, including enterprise, software development, banking, social media, and other applications. Such applications often demand efficient and productive use of a given computing session that is used, e.g., by a browser client, to interact with a cloud-based application or other web application.

Systems and methods for optimizing use of computing resources associated with a given computing session can be particularly important in enterprise applications, which often demand use of computing resources that are external to a given enterprise application. As such, enterprise applications often rely heavily upon integration with other web-based functionality, e.g., web services, Application Programming Interfaces (APIs), and so on, to interact with and leverage or use other computing resources, e.g., backend enterprise databases, and so on.

In particular, certain enterprise applications and associated functionality may benefit from use of data and functionality afforded by one or more web applications that are external to the enterprise application. However, such external web applications may demand that a user log into the application, e.g., by providing login credentials, thereby activating a secure session between the web application and the client, e.g., computer and browser used to log into the web application.

Conventionally, mechanisms for enabling another application, e.g., an enterprise application, to access, modify, or otherwise leverage data and/or functionality provided via such a secure session are lacking.

SUMMARY

An example method facilitates interaction between computing sessions, e.g., computing sessions of one or more web applications. The example method includes initiating a first computing session with a first application; providing interface information to the first application via the first computing session, wherein the interface information characterizes a second session with a second application; and causing the first application to use the second application by employing the interface information that characterizes the second session of the second application in one or more messages transferred from the first application to the second application. Accordingly, the first application uses the first session to communicate with the second session, whereby the first session appears as belonging to the second session from the perspective of the second application.

In a more specific embodiment, the example method further includes causing the first application to leverage data and/or functionality of the second application, wherein the data and/or functionality of the second application is accessed by the first application using the first session and the interface information that characterizes the second session of the second application, thereby causing a request message from the first session to the second session to appear to the second application as coming from the second session.

The first application may include a cloud-based enterprise application, and the second application may include an external a web application, i.e., a web application that is external to the could-based enterprise application, which may also be a web application. The second session may include or represent a user session, and the second session may include or represent a session leveraged by the cloud-based enterprise application, thereby augmenting data or functionality used by the cloud-based enterprise application.

In the specific embodiment, the example method may further include sending a first login request and first login credentials from a browser to the first application, the first application initiating the first session in response to the request and login credentials. Providing interface information may further include sending a second login request and second login credentials from a browser to the second application, wherein the second application initiates the second session in response to the second request and second login credentials. Accordingly, the browser may be employed to obtain the interface information characterizing the second session, based on data exchanged between the browser and the second session after initiation of the second session. The interface information can then be used by the browser and the first application and first session to communicate with the second application via the second session.

The interface information may include, for example, a portion of a session Uniform Resource Locator (URL). Delivering of the interface information may further include replicating one or more portions of the session URL to create one or more modified URLs; and employing the first session to use the one or more modified URLs to interface with the second session, thereby enabling the first session to act as part of the second session to leverage data or functionality of second application via the second session.

Accordingly, certain embodiments discussed herein may enable a browser to initiate multiple sessions, e.g., with one or more disparate or heterogeneous web applications. One or more certain sessions are informed of a particular session (e.g., a session of a web application, where interfacing information needed to interact with the particular session is provided to the one or more certain sessions), such that the one or more certain sessions can participate in the particular session, thereby effectively becoming part of the particular session.

Accordingly, another example method may involve initiating a first session with an enterprise application via a web browser; starting, via the browser, a second session with a web application that is external to the enterprise application, wherein the second session represents a user session with the web application; passing interface information about the second session to the first session, thereby making the interface information available to the enterprise application; and using the enterprise application and the information to communicate with the web application so that the web application treats communications with the enterprise application as part of the second session.

Accordingly, various embodiments discussed herein enable efficiently extending the data and functionality of a web application and/or business application without needing to modify the web application and/or business application. This enables efficient integration of different software applications running different sessions, whereby functionality of a second application is harvested by a first application using session information characterizing the second application. This enables the first application to interact with the second application as though the first application and associated session is part of the second session of the second application, e.g., as though the first application is a user of the second session. Accordingly, a single session, e.g., of a web application, can be efficiently shared by multiple clients.

A further understanding of the nature and the advantages of particular embodiments disclosed herein may be realized by reference of the remaining portions of the specification and the attached drawings.

DETAILED DESCRIPTION OF EMBODIMENTS

Figure 1:
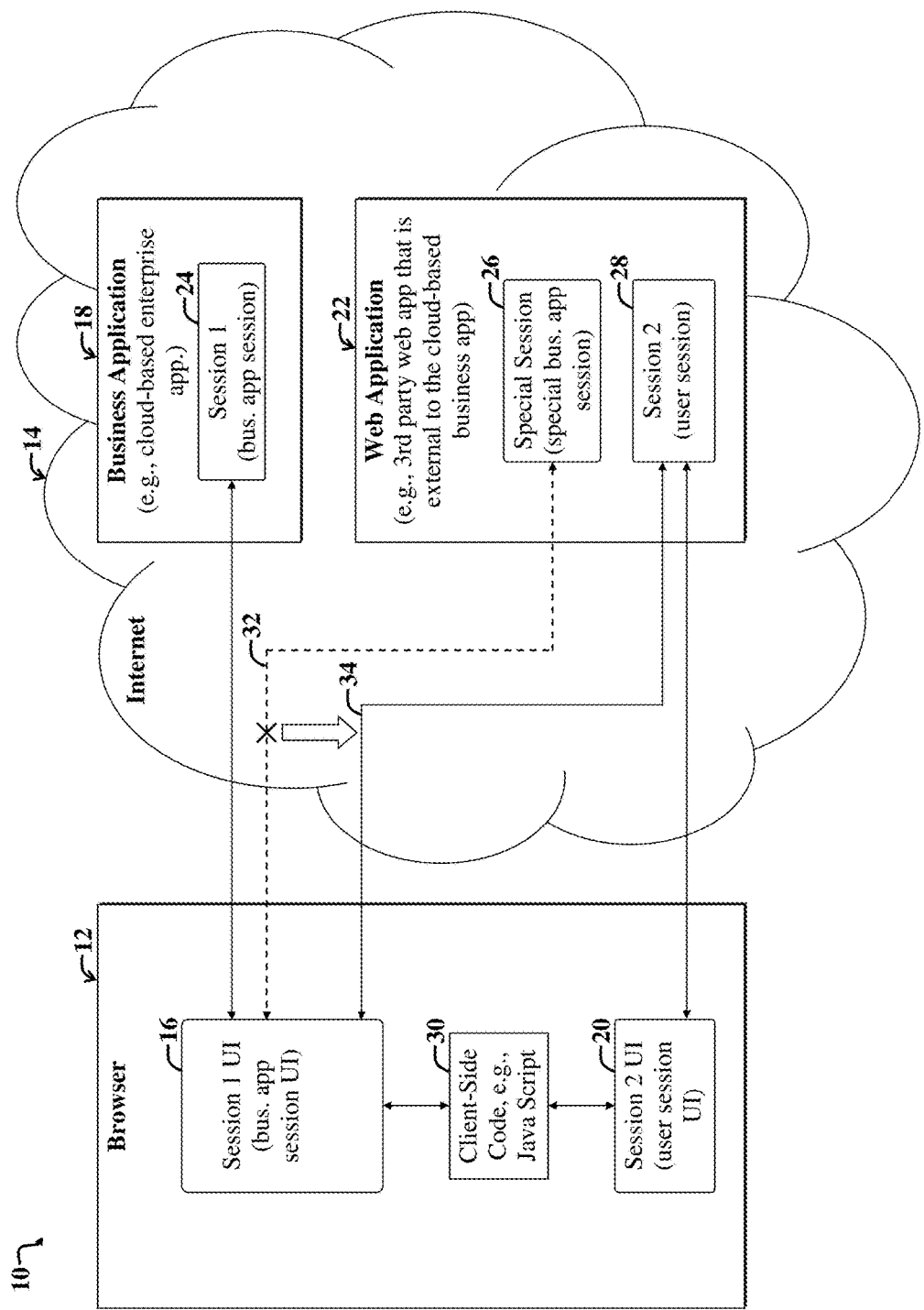
FIG. 1 is first a block diagram illustrating a first example system and accompanying environment configured to facilitate interaction between disparate software applications via their respective computing sessions.

For optimal use of software resources and functionality available via a network, software applications may require interaction with external web applications using the same browser-created session. The need for software applications to interact with external web applications to leverage or otherwise use data and/or functionality afforded by the external web applications can be particularly important for cloud-based enterprise applications, which often rely upon efficient integration with other networked software applications.

Conventionally, a web application may establish a secure session with the client (browser user), wherein the secure session is not sharable across two heterogeneous clients using conventional approaches.

In an example conventional scenario, a user may log into a web-based application; may provide credentials, enabling a user to access information and software functionality in accordance with permissions allocated to the credentials. For example, a user logging into a web-based banking application may have access to their account information through the session created upon logging in. However, if the user wishes to use a second software application to access the banking data and/or functionality from the banking application, conventionally, the second software application is unable to efficiently do so.

Accordingly, conventional requirements to use separate sessions for different clients interacting with a web application can constrain available software functionality, e.g., prevent a separate software application from communicating with the web application without using its own separate session with the web application. A software application that may require access to or must modify data available from a particular session of the web application may be unable to access and/or modify that data outside of the particular session. Various embodiments discussed herein efficiently address this problem without requiring changes to the web application.

For the purposes of the present discussion, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. Examples of enterprise software include Enterprise Resource Planning (ERP) software for facilitating managing enterprise activities (e.g., product planning, inventory management, marketing, sales, and so on). Example ERP applications include Customer Relationship Management (CRM), Human Capital Management (HCM), Business Intelligence (BI), enterprise asset management, enterprise asset management, corporate performance and governance applications, and so on.

The terms "enterprise software," "enterprise application," and "business application" may be employed interchangeably herein. However, an enterprise application may include one or more enterprise software modules or components, such as UI software modules or components.

Software functionality may be any function, capability, or feature, e.g., stored or arranged data, that is provided via computer code, i.e., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

For clarity, certain well-known components, such as hard drives, processors, operating systems, power supplies, routers, Internet Service Providers (ISPs), identity management systems, workflow orchestrators, process schedulers, integration brokers, Tenant Automation Systems (TASs), OnLine Analytical Processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 is first a block diagram illustrating a first example system 10 and accompanying environment configured to facilitate interaction between disparate heterogeneous software applications 18, 22 via their respective computing sessions.

For the purposes of the present discussion, two software applications are called heterogeneous if the software applications are accessed, e.g., by a user and/or software application, using different computing sessions. A computing session may be any instance of a dialog or information exchange between computing devices or software applications, wherein one or more of the computing devices or software applications have provided authentication credentials or login information (e.g., username and password) of a user of one or more of the computing devices to initiate the computing session. The terms "computing session" and "session" may be employed interchangeably herein.

Similarly, a second software application is said to be external to a first software application if the second software application uses its own authentication process, i.e., sign-on process, to enable access thereto.

In the present example embodiment, a browser 12, e.g., as may run on a computing device (e.g., desktop computer, laptop, smartphone, etc.) is used to access a network, such as the Internet 14, and associated software applications 18, 22 running thereon or otherwise connected thereto. The example software applications 18, 22 include a business application 18 running on a server system, e.g., a cloud, of an enterprise, and a third party web application 22 that is external to the business application 18 and may run on a different server system than that used to host and run code of the business application 18.

The business application 18 may be a cloud-based enterprise application. For the purposes of the present discussion, a cloud-based application may be any application that runs on one or more servers, e.g., Server Oriented Architecture (SOA) servers, which are coupled to or otherwise included in the Internet or other network.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. An SOA server may be any server that is adapted to facilitate providing services or subprocesses accessible to one or more client computers coupled to a network.

In the present example embodiment, the browser 12 communicates with the business application 18 and the web application 22 using a first session 24 and a second session 28, respectively.

Note that use of the terms "first" and "second" may be interchanged, without departing from the scope of the present teachings. For example, in some cases, a session (e.g., the first session 24) maintained by the business application 18 may be called the second session, and a session (e.g., the second session 28) maintained by the web application 22 may be called the first session, or vice versa. Accordingly, the terms "first" and "second" do not necessarily imply a given session-activation order, but instead are merely used herein to distinguish sessions.

Similarly, the terms "primary" and "secondary" application do not necessarily imply activation order or control hierarchy. Nevertheless, taken in context, sometimes the term "primary application" can identify an application that acts as a client to a "secondary application," but not necessarily.

For the purposes of the present discussion, a web application may be any software application, e.g., a server-side application, which may be accessed via one or more clients, e.g., a browser running on a computing device coupled to a network, such as the Internet. Accordingly, in the present example embodiment, the business application 18 and the web application 22 are both web applications. Nevertheless, the business application 18 is called such to facilitate distinguishing between the applications 18, 22, i.e., presenting them as heterogeneous software applications that may run on different server systems or clouds.

Furthermore, in various embodiments discussed herein, the business application 18 includes computer code for facilitating leveraging software and associated data and/or functionality of the external web application 22 for use by the business application 18 via a common session, e.g., the second session 28, as discussed more fully below. Accordingly, the business application 18 is sometimes called the primary application, whereas the web application 22 is sometimes called the secondary application herein.

Depending upon the context in which the term is used, a session may be supported by server-side software, e.g., the business application 18 and/or the web application 22, and may be accessed via one or more User Interface (UI) display screens 16, 20 of the browser 12. Such a session is said to run server-side and may include server-side storage of information that persists during a given communications interaction (i.e., session interaction) with an application, e.g., a web application. In other context, the session may refer to the associated authenticated browser-application communications exchange or interaction. Note that session information, e.g., information describing session communication state, can be maintained at the browser 12, without departing from the scope of the present teachings.

In the present example embodiment, the client-side UI display screens 16, 20 are called session UIs herein. The session UIs 16, 20 access server-side software functionality of the server-side applications 18, 22, through respective sessions 24, 28 running server-side.

The first session UI 16 provides user (i.e., a user of the browser 12) access to software functionality provided via the first session 24 of the business application 18. Similarly, a second session UI 20 communicates with the web application 22 via a second session 28 thereof. The second session 28 is called a user session herein to indicate that a user has employed the second session UI 20 to log into the web application 22 to start the second session 28.

The log-in process, also called a sign-in process herein, may involve a user supplying a username and password (and/or other authentication information) to the web application 22 after using the browser 12 to browse to a network address of the web application 22. The term "user session" is used herein to distinguish between a browser-client session with a web application, and a software-application session that involves a software program (other than a client-side browser, e.g., the business application 18) providing authentication information to authenticate and/or identify a software application (as opposed to a user per se) and associated permissions to access another software application.

Note that, in absence of use of various embodiments discussed herein, the business application 18 may use a separate special session 26 of the web application 22 and associated communication link 32 to communicate with the web application 22.

Various UI controls for enabling users to access the web application 22 via the first session UI 16 may be provided in the first session UI 16. However, use of the separate special session 26, i.e., a session that is outside of the user session 28, can be problematic, to the extent that data and functionality that may be available via the second session 28, i.e., user session, of the web application 22 may not be available to the business application 18 and associated first session 24 and associated first session UI 16. This may occur, for example, when the special session 26 does not have access to the second session 28.

To address such issues, use of the special session 26 and associated communications link 32 is obviated via strategic use of interface information characterizing the second session 28, as discussed more fully below. For the purposes of the present discussion, interface information may be any information, e.g., metadata, characterizing or describing a computing session sufficiently to enable another software application to use the information to access the software application through the particular session described by the information. Accordingly, a first software application that uses interface information characterizing a session of a second software application may access data and functionality of the second software application via the session by employing the interface information.

In the present example embodiment, the interface information may include the session definitions and metadata describing session communications, wherein the definitions and other metadata (e.g., session ID, session tokens, etc.) may be provided in Uniform Resource Locators (URLs), message headers, cookies, and/or other data that may be maintained by or otherwise accessible to the browser 12, e.g., via the first session UI 16 and associated client-side computer code (e.g., JavaScript) 30. The following are examples of types of headers that can be used to maintain a common session: Cookie, Authorization, User-Agent, Cookie2, Accept-Encoding, ECID (Exclusive Chip Identification) Context, TE (Time of Expiration), Connection, and so on.

For the purposes of the present discussion, a cookie may be data (e.g., as may be stored as text) that is stored client-side using a browser. For example, a cookie may be used for session authentication purposes, storing of site preferences, shopping cart items, server session identification, and so on.

The terms "session identifier" (session ID) and session token may be employed interchangeably herein to refer to data used in network communications to identify a series of message exchanges associated with a given computing session. Note that instead of, or in addition to, storing session information via browser cookies, some sessions may use a unique session ID that may be stored client-side and selectively passed to a server when the browser makes a request (e.g., a HyperText Transfer Protocol (HTTP) page link or request). A web application may match the session ID with an entry in a database used by the web application to facilitate retrieving stored data for incorporation in a requested page to be served to a client browser.

In the present example embodiment, the first session UI 16 includes one or more UI controls and/or is otherwise associated with functionality enabling activation of the client-side computer code 30 for interacting with one or more UI controls and/or associated software functionality associated with the second session UI 20. For example, the first session UI 16 may include one or more UI controls for triggering initiation of the second session 28 and associated second session UI 20. Once initiated, e.g., after a user provides user log-in information via the second session UI 20 to start the second session 28, the client-side computer code 30 may extract interface information from the second session 28 by intercepting one or more communications, cookies, session IDs, etc., from the second session 28 and communications with the second session UI 20.

This interface information, describing the second session 28 and associated communications between the second session UI 20 and the second session 28 of the web application 22, is then used by the first session UI 16 and associated first session 24 to establish a new communications link 34 between the first session UI 16 and associated first session 24, and the second session 28.

Accordingly, use of the special session 26 is obviated via use (by the first session 24 and first session UI 16) of the interface information describing the second session 28. In other words, the first session 24 may now communicate with the second session 28 via the browser 12 and associated first session UI 16 using the interface information describing the second session 28, i.e., user session.

Note that while in the present example embodiment, the first session 24 is shown communicating with the second session 28 via the browser 28 and associated client-side code 30, that embodiments are not limited thereto. For example, the interface information describing the second session 28 may be passed from the second session 28 to the second session UI 20; to the first session UI 16 and associated client-side code 30; then to the first session 24 maintained by the business application 18. Subsequently, the business application 18 may employ the first session 24 and the retrieved interface information describing the second session 28, to access the web application 22 via the second session 28, without requiring communications to be routed through the browser 12.

Figure 2:
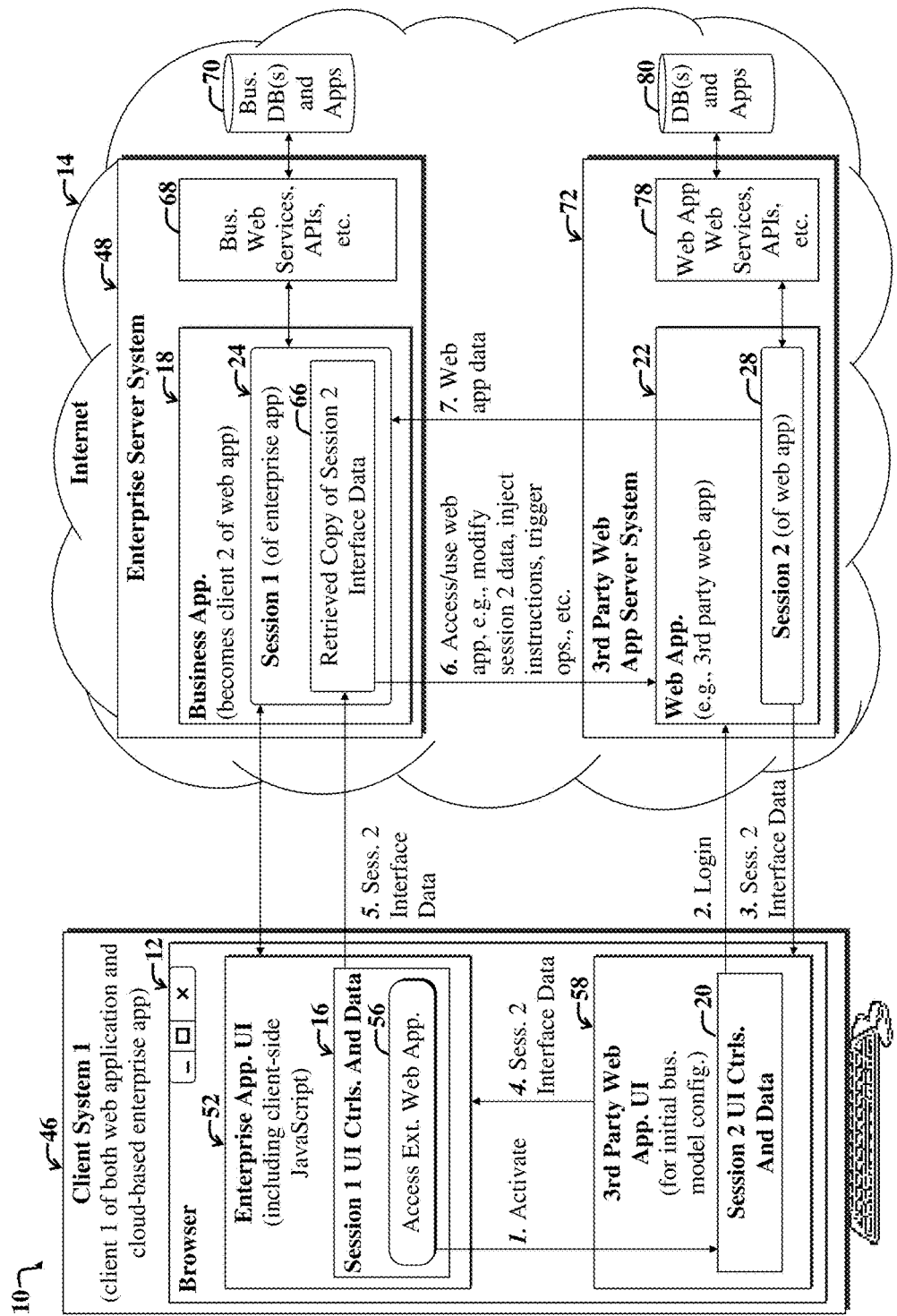
FIG. 2 is a more detailed block diagram showing additional example implementation details of the system of FIG. 1.

FIG. 2 is a more detailed block diagram showing additional example implementation details of the system 10 of FIG. 1. Note that in general, groupings of various modules of the system 10 shown in FIGS. 1 and 2 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For example, note that while the bowser 12 is shown displaying a first session UI 16 and a second session UI 20 via an enterprise application UI 52 and a third part web application UI 58, respectively, that the third party web application UI 58 may be incorporated within the enterprise application UI 52. Furthermore, in certain implementations, the enterprise application UI 52 and third party web application UI 58 may be run in separate browsers, windows, tabs, and so on, without departing from the scope of the present teachings.

In general, certain server-side, i.e., cloud-based modules (i.e., running on a server or server system) may be implemented client-side (e.g., running on a client computer communicating with a server), and vice versa, in a manner different than shown in FIGS. 1-2. For example, some functionality of the client-side code 30 (shown in FIG. 1), e.g., generation of commands to refresh the second session UI 20 after the business application 18 modifies data governed by the second session 28, may be implemented, in part, via server-side computer software of the business application 18 and/or web application 22, without departing from the scope of the present teachings.

Note that the client-side code 30 shown in FIG. 1 has been omitted from FIG. 2 for clarity. Nevertheless, the client-side code 30 facilitates interaction (e.g., steps 1. and 4.) between the enterprise application UI 52 (and associated first session UI controls 16) and the third party web application UI 58 (and associated second session UI controls and data 20).

For the purposes of the present discussion, a UI control may be any displayed element or component of a UI display screen, which is adapted to enable a user to provide input, view data, and/or otherwise interact with a UI. Additional examples of user interface controls include buttons, drop down menus, menu items, tap-and-hold functionality, and so on. Similarly, a UI control signal may be any signal that is provided as input for software, wherein the input affects a UI display screen and/or accompanying software application associated with the software.

In the present example embodiment, the browser 12 runs on a client computer system 46 (e.g., desktop computer, mobile device, or other computing device or system). A user has employed the browser 12 to browse to a URL associated with the business application 18 and has logged into the business application 18, thereby starting the first session 24.

The business application 18 is hosted by an enterprise server system 48, i.e., cloud. Accordingly, the business application 18 is said to be a cloud-based enterprise application.

The enterprise application UI 52 is updated with the first session UI controls and data 16. The UI controls and data 16 may include one or more mechanisms enabling user access to data maintained in one or more backend enterprise databases 70. The business application 18 may include computer code for employing one or more web services, Application Programming Interfaces (APIs), and/or other mechanisms to access, manipulate, or otherwise use data and/or functionality afforded by the one or more backend enterprise databases 70.

The business application 48 further includes computer code for displaying a client-side UI control 56 for facilitating access to or otherwise use of data and/or functionality afforded by the web application 22. In the present example embodiment, the web application 22 is hosted by, i.e., runs on a third party web application server system 72. Accordingly, the web application 22 may also be a cloud-based application. The third part application server system 72 and associated web application are external to the enterprise server system 48, to the extent that a separate log-in is used to access the web application 22.

The web application 22 may access backend third party databases and applications 80 via one or more web services, APIs, etc. 78. Access to data and functionality of the third party backend databases and applications 80 is limited in accordance with permissions associated with the second session 28 and associated supplied login credentials. Similarly, access to data and functionality of the backend enterprise databases and applications 70 is limited based on login credentials used to log into the business application 18 and establish the associated first session 24.

In an example scenario, after initiation of the first session 24 and display of the associated enterprise application UI 52, the external web-application-access UI control 56 (for triggering access to the web application 22) of the first session UI 16 is selected. User selection of the external web-application-access UI control 56 triggers a browser window, tab, or other mechanism to browse to a URL associated with the web application 22. This triggers display of the third party web application UI 58 and associated browser window, tab, or other mechanism.

The third party web application UI 58 includes one or more UI controls for enabling a user to provide login credentials (e.g., at step 2.) and log into the web application 22, thereby triggering initiation of the second session 28 and display of associated client-side second session UI controls and data 20 after second session interface data (at step 3.) is delivered to the client system 46 and accompanying browser 12 via the second session 28.

The interface data describing the second session 28 is then captured by the enterprise application UI and accompanying client-side code (e.g., JavaScript) 52 (at step 4.) and then forwarded to the business application 18. A copy of the interface data 66 may be delivered to the business application 18 in a request message or other message that is delivered to the server-side business application 18 from the browser 12 as part of the first session 24 of the business application.

The business application 18 may then use the second session interface data 66 to access and use the external web application 22 via the second session 28 thereof (at steps 6. and 7.). The business application 18 uses the retrieved second session interface data 66 to interface with the second session 28 and to access and/or otherwise manipulate, retrieve, or modify data and/or functionality afforded by the web application 22 through the second session 28 and accompanying backend databases and applications 80.

Note that while in the present example scenario, the business application 18 is shown interfacing with the web application 22 and accompanying second session 28 directly, i.e., bypassing the browser 12, that embodiments are not limited thereto. For example, the business application 18 may route communications with the web application 22 and accompanying second session 28 through the browser 12 (such that steps 6. and 7. are routed through the client system 46 and accompanying browser 12), without departing from the scope of the present teachings. In such case, data that is retrieved from the web application 22 using the second session 28 thereof is first delivered to the client system 46 before being retrieved by the business application 18 via the first session 24 thereof.

Note that while the external web-application-access UI control 56 of the first session UI 16 is shown as a button, that other types of UI controls are possible. For example, when the business application 18 is a composer application (i.e., an application for facilitating developing software), the control 56 may manifest in the enterprise application UI 52, for example, as a representation of a selectable data object. Selection of the data object may trigger uploading of the selected data object to the web application 22 (the data of which may then be stored using the backend databases and applications 80), where the uploading involves sending a request message from the browser 12 to the web application 22.

The request message is from the first session 24 and uses second session interface data (e.g., copies of message headers characterizing the second session 28) so that interactions or messages originating from the first session 24 and accompanying first session UI controls and data 16 (and client-side code, e.g., JavaScript) appear to the web application 22 to be part of the second session 28 and accompanying interaction with the third party web application UI 58.

The client-side computer code that supports the enterprise application UI 52 may then trigger a refresh of the second session UI controls and data 20 by delivering (e.g., from the browser 12 or directly from the server-side business application 18 and accompanying first session 24) a reload request to the web application 22 to refresh the web page corresponding to the third party web application UI 58 and accompanying second session UI controls and data 20.

Note that the reload request (and/or other request message) may be delivered to the web application 22 and accompanying second session 28, using client-side code used for the first session UI controls and data 16. Alternatively, or in addition, the client side code (underlying the enterprise application UI 52) triggers the server-side business application 18 to handle the request to the third party web application 22, where the first session 24 of the business application 18 acts as a user client of the second session 28 through backend communications (e.g., as represented by steps 6. and 7.) therewith.

Figure 3:
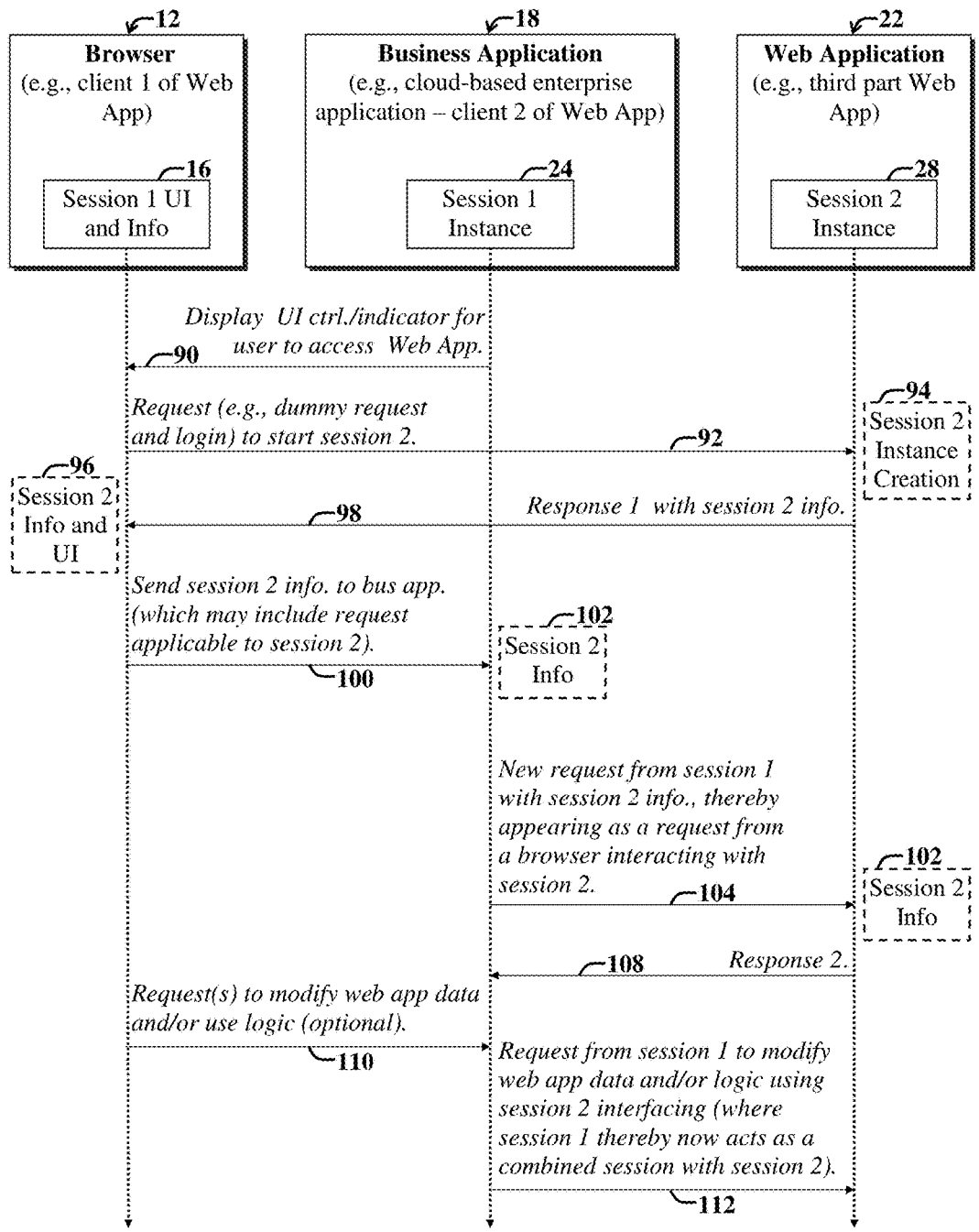
FIG. 3 is an example ping-pong diagram illustrating example communications between a browser, business application, and an external web application that is external from the business application, which may also be a type of web application.

FIG. 3 is an example ping-pong diagram illustrating example communications 90-112 between the browser 12, business application 18, and an external web application 22 that is external from the business application 18.

In FIG. 3, the first session 24 has already been initiated, and the first session UI and data 16 is displayed in a web page of the browser 12. As the user interacts with the first session UI and data 16, a UI control (e.g., the control 56 of FIG. 2) for initiating and/or accessing a second session 28 of the web application 22 may be served for rendering in the first session UI 16 at step 90.

If the second session 28 has not already started, then the second session 28 can be initiated, e.g., by sending a dummy request 92 to start the second session 28. After the dummy request and accompanying login credentials needed to start the second session 28 are delivered to the web application 22, second session instance creation 94 occurs, resulting in the initiation of the second session 28. The web application 22 and accompanying second session instance 28 then issue a response 98 to the browser 12 that includes interface information 96 describing the second session.

The second session interface information 96 is then selectively delivered (on an as-needed basis) by the first session UI and data 16 (and accompanying client-side code) to the business application 18 and accompanying first session instance 24 in an interface-information sending step 100. The business application 18 then maintains the resulting second session interface information 102 server-side as part of the data associated with or used by the first session instance 24.

The business application 18 and accompanying first session 24 may then use the second session interface information 102 to act as a client of the second session 28. The business application 18 and accompanying first session 24 may communicate with the second session 28 using the second session interface information 102 as part of one or more request messages 104 sent from the first session 24 of the business application 18 to the second session 28 of the web application 22. The second session 28 then responds, e.g., in one or more response messages 108, to requests from the first session 24 of the business application 18 as though the first session 24 is part of (i.e., participating in) the second session 28.

Note that after the one or more response messages 108 are received by the first session 24 of the business application 18, that other communications of the business application 18 may occur with the browser 12 as part of the first session 24. For example, one or more pages shown in the browser 12 may be refreshed to reflect any changes made as part of the second session 28. However, for simplicity, such communications are omitted from FIG. 3.

For illustrative purposes, an example request 110 to modify web application data and/or to use logic and/or functionality thereof is delivered from the browser 12 and accompanying first session 16 to the business application 18. The business application 18 and accompanying first session 24 then use the second session interface information 102 to forward the request 112 to the web application 22 and accompanying second instance 28 for further processing.

In summary, after establishment of a session, e.g., the first session 24, 16, with the business application 18, the browser 12 makes a dummy request 92 to the web application, which may include user login credentials, resulting in creation of the second session 28 during session creation 94. The resulting second session 28 (maintained by the web application 22) is valid between the browser 12 and the web application 22.

Inside the browser 12, the first session UI 16 facilitates communications between the browser 12 and the business application 18 via the first session 24 thereof. The browser 12 next issues a request 100 that includes session information (i.e., second session interface information 102) to the business application 18 using the first session UI 16.

The business application 18 then creates a new web request 104 to the web application 22 using the using the second session interface information 102 obtained from the browser 12.

Note that the web application 22 need not distinguish between the communications of the first session 24 that come from the browser 12 versus communications that come from the business application 18 (e.g., by way of the first session 24), to the extent that the web application 22 processes the communications similarly. Accordingly, the business application 18 may modify data governed by the second session 28; may inject new data or instructions, and so on.

Hence, a three-way communication is enabled (involving the browser 12, business application 18 and web application 22) that is transparent to the web application 22, all without requiring changes to the web application 22. This approach can be applied to virtually any web application, without needing to modify the web application.

In a specific example use case, the first session 24 and second session 28 are related to a business process management workflow, which may include a design phase and a runtime phase. For purposes of the 3-way communication using a user session (e.g., the second session of the web application 22) instead of requiring initiation of a separate application session of the web application 22, design time and runtime workflows can use similar methodologies.

Details of an example design time session workflow that uses a methodology similar to that illustrated in FIGS. 1-3 are discussed more fully below. In the example use case, the business application 18 represents a composer application, i.e., an application used to facilitate development of software applications.

After a user clicks "OK" in a UI display screen of the first session UI 16, the user is taken to a subsequent UI display screen that includes UI control enabling user selection of a "Manage Business Objects" UI control of the composer UI that corresponds to the first session UI 16.

Upon user selection of the "Manage Business Objects" UI control, the Composer UI 16 opens a dialog box with one or more UI controls enabling user selection of one or more business objects associated with the composer application 18.

After a particular UI control corresponding to a business object is selected in the composer UI 16, the composer UI 16 (and accompanying client-side code) issues a request message to the composer server-side application 18. In the composer server-side application 18, headers (describing the second session 28 and representing second session interface information) are copied to create a new request to the web application 22 and associated second session 28. The selected business object is then uploaded by the web application 22 (e.g., from the databases and applications 80 of FIG. 2) as if the request was made from the second session UI (e.g., the UI 20 of FIG. 1) created in the browser 12.

With reference to FIGS. 2 and 3, once the upload is complete, control is sent back to composer UI 16 in the browser 12. The composer UI 16 may use JavaScript (e.g., representing the client-side code 30 of FIG. 1) to refresh the web application page (e.g., the second session UI 20 of FIGS. 1-3). After the upload and after the web application page 20 is refreshed, the web application page 20 will show details of the data object that was selected using the composer UI 16 (e.g., enterprise application page). Furthermore, the business application 18 and accompanying first session 24 will have access to the data object details that are displayed in the web application page 20. Note that a version of the web application page 20 may be displayed within the first session UI 16, without departing from the scope of the present teachings.

Accordingly, the business object was injected from the composer application 18 (and associated first session 24) into the web application 22 (and associated second session 28) without requiring any change to the web application 22.

Note that, in the present example embodiment, one or more types of headers can be used to maintain a common session: Cookie, Authorization, User-Agent, Cookie2, Accept-Encoding, ECID-Context, TE, Connection, as set forth above.

An example of how a header can be overwritten to cause the web application 22 to use the same session 28 for communications with both the browser 12 and an application 18 are shown in Table 1 below. Table 1, illustrates an example session update of the web application 22 via a composer application 18 (represented by the business application 18 in the present example use case scenario).

TABLE 1

| Browser URL | Business App (e.g., Composer) URL(s) | Web Application URL |
|---|---|---|
| 1.<br>The browser issues a request as URL 1:<br>URL 1: https://myhost.us2.xyzcloud.com/bpm/composer/createnew form?form_businessobject = MyBusinessObject | 2.<br>Composer constructs the URL 2 to connect to the web application:<br>URL 2: http://internalhost.xyzcloudInternal.com:7001/abcexternalwebapp/api/upload?form_schema.<br>4.<br>Composer modifies URL 3 to URL 4 as follows:<br>URL 4: https://myhost.us2.xyzcloud.com/abcexternalwebapp/web | 3.<br>The web application returns form designer URL 3:<br>URL 3:<br>http://internalhost.xyzcloudInternal.com:7001/abcexternalwebapp/web. . . |

In the present example use case, the browser 12 issues the request message 110 (which may originate from the first session 24 of the business application 18) in the form of a first URL (URL 1) in Table 1 below to start an upload process to the web application 22 and accompanying databases 80 (as shown in FIG. 2).

The composer application (i.e., business application 18) then constructs a second request message and accompanying URL (URL 2) 112 shown in Table 1, and then uses the second URL (which incorporates the second session interface information 102) to connect to the web application 22 and accompanying second session 28.

In the present example use case, the first URL represents an example use of an HTTP POST request method (requesting that one or more servers hosting the web application 22 accept and store data described via the XML (eXtensible Markup Language) Schema Definition (XSD), which is included in the POST request associated with the first URL 110).

The description of the selected business object, which is incorporated into the second request message 112 that associated with the second URL, is incorporated into a Zip file with XSD Documentation describing the selected business object (e.g., "MyBusinessObject"). During use of the second URL and associated delivery of the POST method message 112 from the business application 18 to the web application 22, the business application 18 mimics a UI (e.g., a Frevvo UI) associated with the second session 28 of the web application 22.

Note that in certain implementations, a user of the browser 12 may not directly upload the XSD for the business object from the browser 12 to the second session 28 of the web application 22, but may instead employ the intermediate business application 18 (e.g., a composer) and associated first session 24 to issue the second URL 112 and accompanying POST request message 112.

After a few more interactions (e.g., message exchanges between the business application 18 and the web application 22), the web application 22 returns a form designer third URL (URL 3—not shown in FIG. 3), which is valid only for that session 28. The third URL is not accessible to the browser 12.

Accordingly, the composer application 18 then modifies the third URL, resulting in a fourth URL (URL 4—not shown in FIG. 4) and then returns control to the composer UI 16 in the browser 12. The composer UI 16 then loads the fourth URL into a form designer frame illustrating the selected business object first session UI 16.

Figure 4:
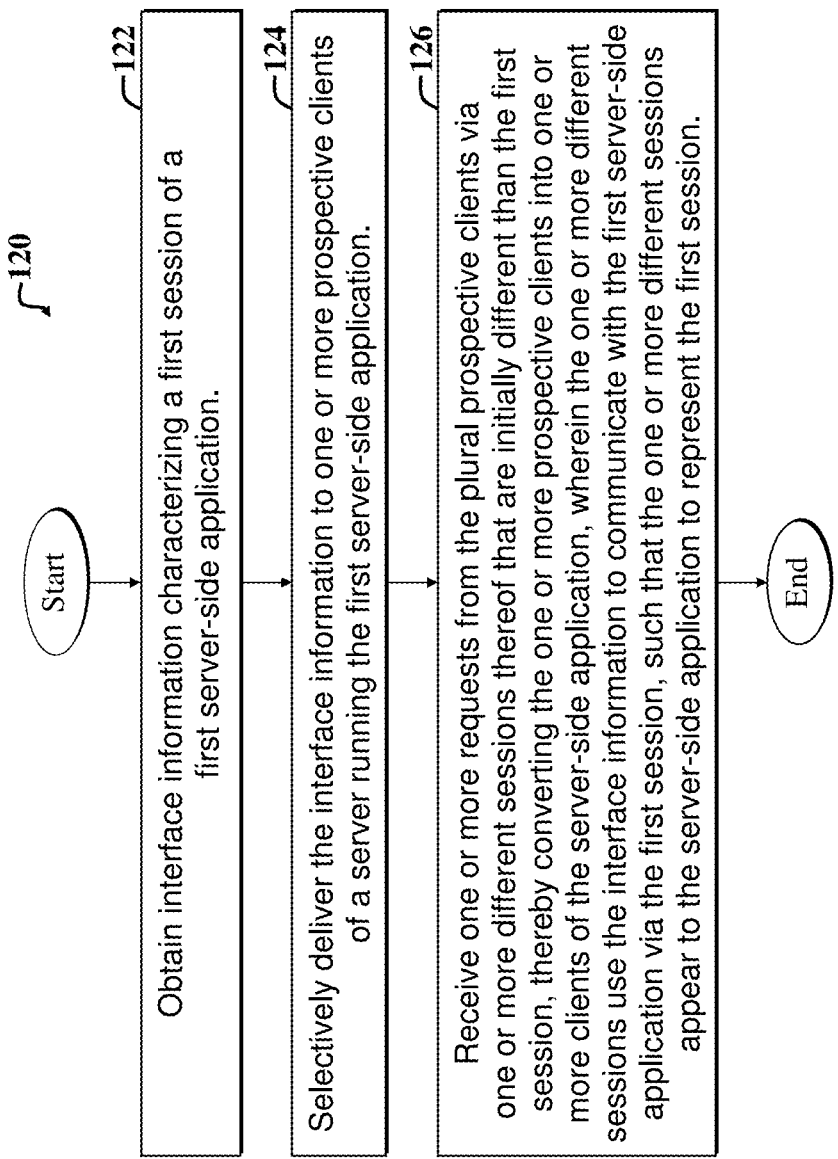
FIG. 4 is a flow diagram of a first example method implementable via the embodiments of FIGS. 1-3.

FIG. 4 is a flow diagram of a first example method 120 implementable via the embodiments of FIGS. 1-3. The example method 120 addresses sharing of a session across heterogeneous clients, from the perspective of a web application (called the server-side application in the method 120 of FIG. 4), where the enterprise application may be one of the clients of the web application and may also be a type of web application. Note that the term "first session" referenced in FIG. 4 is analogous to the "second session" discussed above with reference to FIGS. 1-3.

With reference to FIGS. 2 and 4, the first example method 120 represents a method for facilitating sharing a session 28 of a server-side application 22 with different clients, e.g., a browser client 12 (and accompanying second session UI controls and data 20, and optionally, the first session UI controls and data 16)) and a cloud-based enterprise application client 48 (and accompanying first session 24 thereof) or other web application. A first interface-information-obtaining step 122 involves obtaining interface information (e.g., at steps 3. and 4. in FIG. 2) characterizing a first session (e.g., corresponding to the second session 28 of FIG. 2) of a first server-side application, e.g., web application 22.

A second interface-information-delivering step 124 includes selectively delivering (e.g., in response to a request message from a browser) the interface information (e.g., at steps 3. and 4. in FIG. 2) to one or more prospective clients 12, 48 of a server 72 running the first server-side application 22. Note that the client 48 of FIG. 2 is called a "prospective client" as at this point in the method 120, as the accompanying business application 18 to receive the interface information has yet to officially join the first session (second session 28 of FIG. 2) of the first server-side application (e.g., web application 22 of FIG. 2.

A third request-receiving step 126 involves the first server-side application 22 receiving one or more requests, i.e., request messages, from the one or more prospective clients 18 via one or more different sessions 24 thereof (e.g., as shown in FIG. 3), thereby converting the one or more prospective clients 18 into one or more clients of the server-side application 22. The one or more different sessions 24 use the interface information to communicate with the first server-side application 22 via the first session (e.g., corresponding to the second session 28 in FIGS. 2 and 3). Accordingly, the one or more different sessions 24 appear to the server-side application 22 to represent the first session 28 thereof. By using the interface information to interact with the first session 28, the one or more different sessions 24 effectively become part of the first session 28.

In the present example embodiment, the one or more different sessions 24 may represent one or more sessions with one or more enterprise applications 18 that are different than the first server-side application 22. The first server-side application 22 may include or represent a web application, e.g., a third party web application that is maintained by a party other than the enterprise associated with the enterprise application 18 or that otherwise uses a separate login process from the one or more enterprise applications 18.

Note that the first example method 120 may be modified, e.g., augmented or otherwise changed, without departing from the scope of the present teachings. For example, the method 120 may further specify that the interface information includes a portion of a session Uniform Resource Locator (URL) describing the first session 28.

The second interface-information-delivering step 124 may further include replicating one or more portions of the session URL to create one or more modified URLs; and employing the one or more different sessions associated with the one or more clients to use the one or more modified URLs to interface with the first session, thereby enabling the one or more different sessions to act as part of the first session to leverage data or functionality of the server-side application via the first session and the respective one or more different sessions.

The first session may represent a user session 28, which may be established, in part, upon receipt of user-supplied login credentials, where the login credentials (e.g., username and password) are supplied using a browser that displays a login interface applicable to the first session.

A session of the one or more different sessions may include a session leveraged by a cloud-based enterprise application (e.g., business application) to augment data or functionality by the cloud-based enterprise application.

The example method 120 may be modified to alternatively specify the following steps, wherein the roles of the enterprise application(s) and third party web application(s) discussed above are reversed, such that the steps are recited from the perspective of an enterprise application using a third party web application: receiving, from a browser, one or more requests to initiate one or more sessions with one or more web applications that are external to an enterprise application; receiving at the enterprise application, interface information, wherein the interface information characterizes the one or more sessions of the one or more web applications, respectively; using the enterprise application and the interface information to communicate with the one or more sessions using the respective one or more sessions and a session of the enterprise application, such that the session of the enterprise application appears, from the perspective of the one or more web applications, to be part of the one or more sessions.

The one or more clients may include the enterprise application, whereby the enterprise application is a client of the server-side application, and the server-side application represents a web application.

Figure 5:
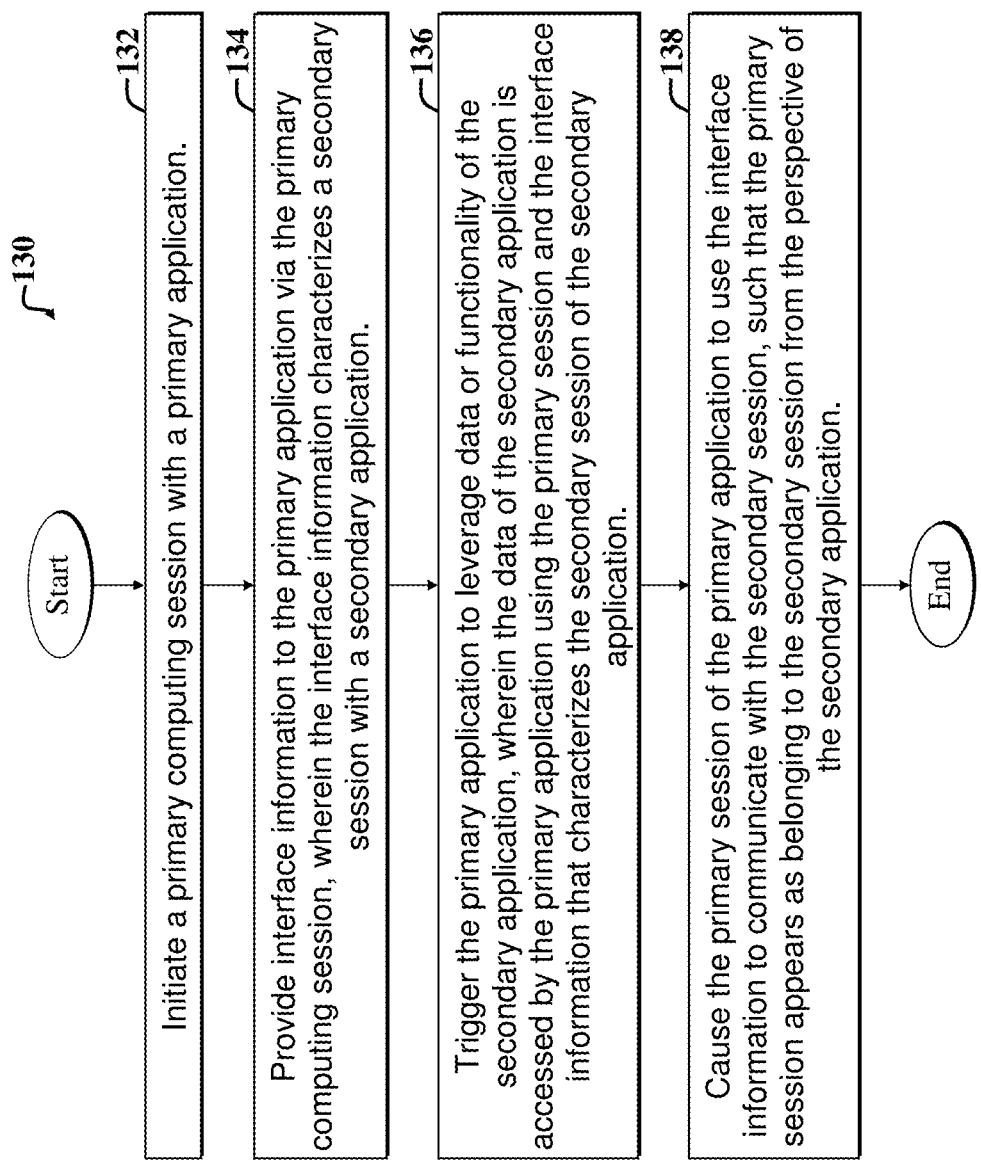
FIG. 5 is a flow diagram of a second example method implementable via the embodiments of FIGS. 1-3.

FIG. 5 is a flow diagram of a second example method 130 implementable via the embodiments of FIGS. 1-3. The second example method 130 is from the perspective of a browser and incorporates or represents a method for transferring initial session interface information from one software application to another software application to allow a session of the other application to interact with the initial session characterized by the session interface information.

The second example method 130 facilitates interaction between computing sessions of different applications by routing communications through one of the sessions. The second example method 132 includes a first initiating-step 132, which involves initiating a primary computing session with a primary application.

A second interface-information-providing step 134 includes providing interface information to the primary application (e.g., an enterprise application) via the primary computing session. The interface information characterizes a secondary session with a secondary application (e.g., a third party web application).

A third information-leveraging step 136 includes triggering the primary application primary application to use the secondary application using the interface information that characterizes the secondary session of the secondary application in one or more messages transferred from the first application to the second application.

Note that the primary application is said to use the secondary application if it leverages or otherwise accesses modifies or employs data and/or functionality of the secondary application.

In a fourth communicating step 138, during further communications between the primary application and secondary application, the primary session of the primary application uses the interface information to communicate with the secondary session, such that the primary session appears as belonging to the secondary session from the perspective of the secondary application.

Note that the second example method 130 may be further modified or augmented, without departing from the scope of the present teachings. For example, the third information-leveraging step 136 and/or the fourth communicating step 138 may further specify that the primary application is triggered to leverage or otherwise use or access functionality of the secondary application in addition to or instead of merely data. The functionality of the secondary application is accessed by the primary application using the primary session and the interface information that characterizes the secondary session of the secondary application, thereby causing a request message from the primary session to the secondary session to appear to the secondary application as coming from the secondary session.

The primary application may represent a cloud-based enterprise application. The secondary application may represent or otherwise include a web application that is external to the could-based enterprise application.

The first initiating step 132 may further specify sending a first login request and first login credentials from a browser to the primary application. The primary application then initiates the primary session in response to the request and login credentials.

The second interface-information-providing step 134 may further specify sending a second login request and second login credentials from a browser to the secondary application. The secondary application initiates the secondary session in response to the second request and second login credentials.

The second interface-information-providing step 134 may further specify delivering, from a browser, information characterizing the secondary session, wherein the secondary session has been initiated via the browser via one or more request messages sent from the browser to the secondary application via the secondary session.

The one or more request messages include the second login request and second login credentials. The browser may then be employed to obtain the interface information that characterizes or identifies the secondary session, from data (e.g., messages) exchanged between the browser and the secondary session after initiation of the secondary session.

Figure 6:
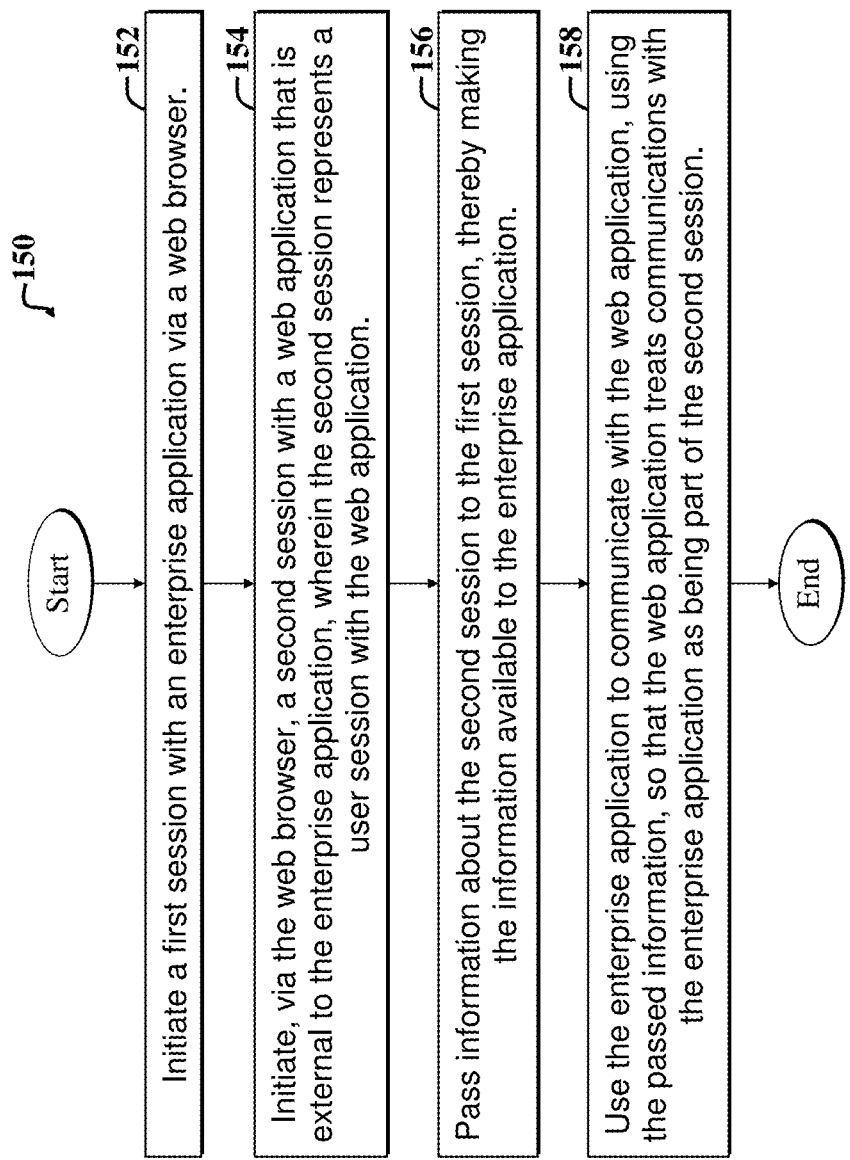
FIG. 6 is a flow diagram of a third example method implementable via the embodiments of FIGS. 1-3.

FIG. 6 is a flow diagram of a second example method 150 implementable via the embodiments of FIGS. 1-3. The third example method 150 represents a method for causing an application (e.g., a second web application that is external to another first web application) to use a same session as a user session with an external web application (e.g., a first web application), wherein the user session communicates with the external web application via a web browser.

The third example method 150 includes a first step 152, which includes using the web browser to initiate a first session with the web application, which may be external to an enterprise application that accommodates a second session. Note that the term "first session" as discussed with reference to FIG. 6 corresponds to the "second session" discussed with reference to FIGS. 1-3, to the extent that the second session referenced in FIG. 6 corresponds to a session of the enterprise application in FIG. 6.

A second step 154 includes using the web browser to initiate a second session with the external application (which may represent a cloud-based enterprise application that may also be a type of web application).

A third step 156 includes passing information about the first session to the external application (e.g., the enterprise application).

A fourth step 158 includes using the external application (e.g., enterprise application) to communicate with the web application by using information about the first session so the web application treats the communications as part of the first session.

Note that the third example method 150 may be modified, without departing from the scope of the present teachings. For example, the method 150 may further specify that the first session is initiated by the web browser with a dummy request to the web application.

The third example method 150 may further include, or alternatively specify: replicating one or more portions of a session URL to create a modified URL; and using the modified URL to create a single session in which both the user session and the external application communicate with the web application.

Note while the example methods discussed with reference to FIGS. 4-6 are merely illustrative. Additional methods are possible within the scope and spirit of the present teachings. For example, an alternative method addresses integration of a first session of a first cloud-based application with subsequent applications running on different clients (by delivering interface information), from the perspective of the first web application (e.g., enterprise application).

Such an example alternative method for selectively expanding the operational scope of a session of a cloud-based application may include: using a first cloud-based application to detect a first request to initiate a first session with the first cloud-based application; initiating the first session in response to the first request; detecting one or more requests to initiate one or more different application sessions associated with one or more respective external applications that are external to the first cloud-based application; initiating one or more different sessions via the one or more respective external applications in response to the one or more requests; and using the cloud-based application to selectively convey interface information about the first session to the one or more different sessions, thereby enabling the one or more different sessions to act as part of the first session, thereby enabling access to data and functionality of the first cloud-based application by the one or more external applications via the one or more subsequent application sessions.

The interface information may include information characterizing the first session. The interface information is usable by the one or more external applications to communicate with the first cloud-based application via the first session.

The alternative method may further include initiating the first session before initiating the one or more different sessions; and selectively conveying interface information characterizing each of the one or more different sessions to the first session, thereby enabling the first session to interact with the one or more different sessions as though the first session is part of the one or more different sessions.

The first cloud-based application may include or represent a web application that is external to the one or more different sessions and associated external applications.

The alternative example method may further include initiating the one or more different sessions before initiating the first session; and selectively conveying the interface information to the one or more different sessions and associated external applications after initiating the first session. The first cloud-based application includes an enterprise application, and the one or more external applications may include one or more web applications that are external to the enterprise application. The one or more external applications can run separately from the first web application.

Figure 7:
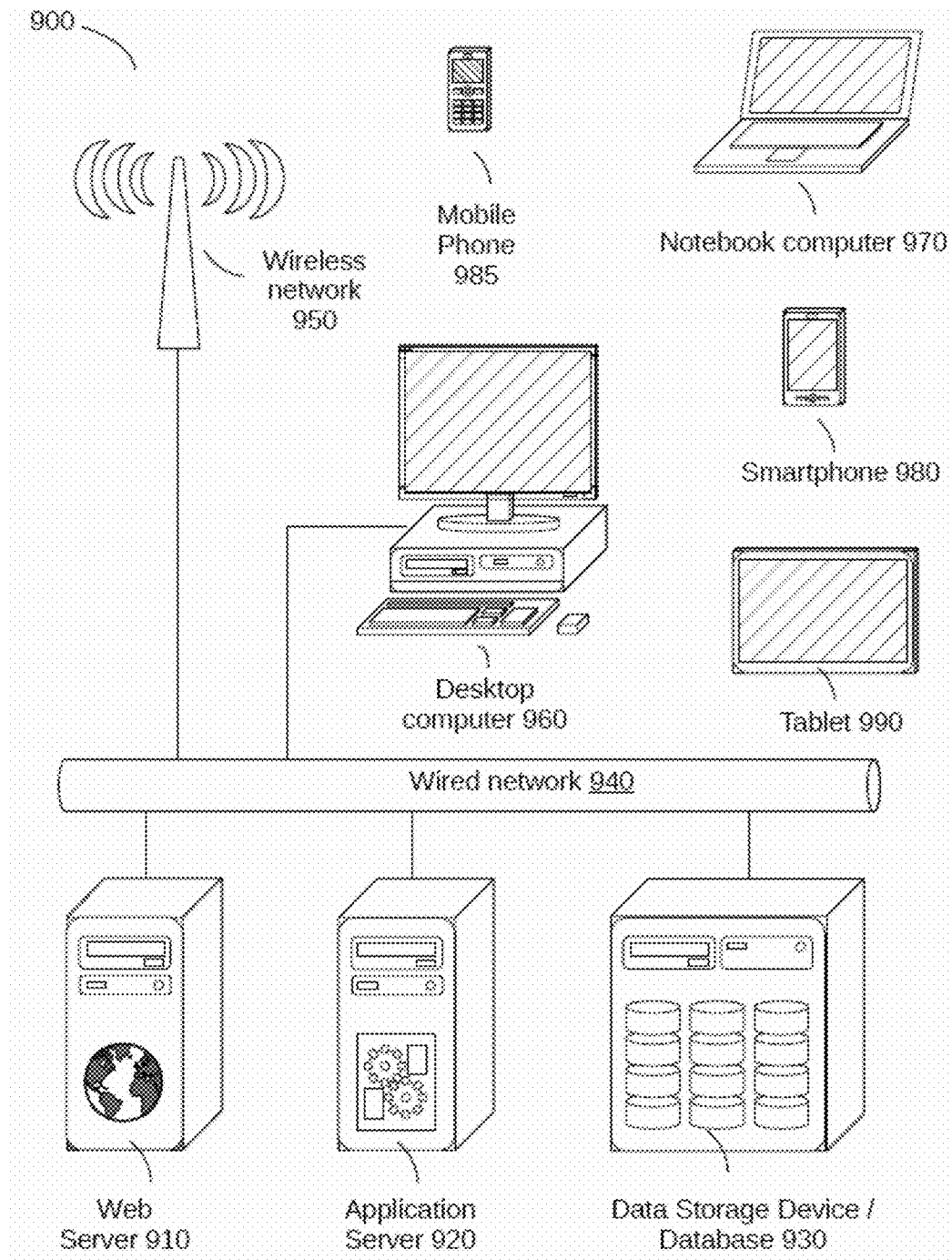
FIG. 7 is a general block diagram of a system and accompanying computing environment usable to implement the embodiments of FIGS. 1-6.

FIG. 7 is a general block diagram of a system 900 and accompanying computing environment usable to implement the embodiments of FIGS. 1-6. The example system 900 is capable of supporting or running various hardware and/or software modules and associated methods discussed with reference to FIGS. 1-6. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as Rich Site Summary (RSS) feeds of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computer.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 2 and 7, the client system 46 of FIG. 2 may be implemented in whole or in part via one or more of the desktop computer 960, notebook computer 970, smartphone 980, mobile phone 985, tablet 990, and/or other computing devices. The computing devices 960-990 may run browsers, e.g., the browser 12 of FIG. 12.

The browser 12 may employ a network, such as the Internet 14 of FIG. 2 (corresponding to the wired network 940, and optionally, the wireless network 950 of FIG. 7) to browse to one or more URLs corresponding to websites and associated web applications 48, 72 of FIG. 2 to access, use, and/or otherwise manipulate data and functionality thereof.

Figure 8:
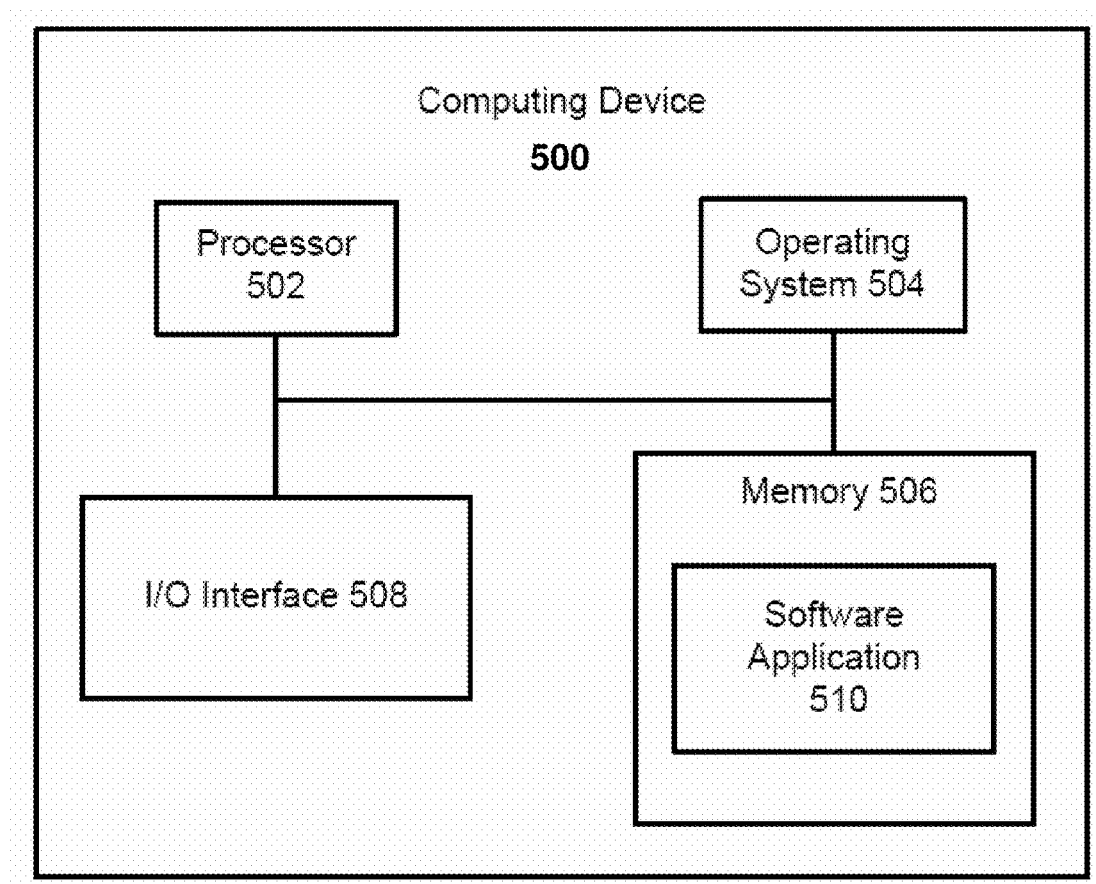
FIG. 8 is a general block diagram of a computing device usable to implement the embodiments of FIGS. 1-7.

Note that generally, the enterprise server system 48 and third party web application server system 72 of FIG. 2 may be implemented via one or more of the servers 910, 920 of FIG. 8. Similarly, the backend databases and applications 70, 80 of FIG. 2 may be hosted by one or more of the data storage device(s) and database(s) 930, which are accessible to the servers 910, 920 via the wired network 940.

More specifically, the business application 18 and accompanying first session 24 and second session interface data 66; in addition to the associated business application web services and APIs 68 of FIG. 2 may run on one or more web servers, as represented by the web server 910 of FIG. 7. Alternatively, or in addition, the business application 18 and web application 22 of FIG. 2 may run on an application server 920, which communicates with web page code running on the web server 910, e.g., via one or more web services and/or APIs. The web page code is accessible via one or more websites that may be browsed to via the client system 46 and accompanying browser 12 of FIG. 2.

Similarly, the third party web application server system 72 of FIG. 2 may be implemented via the web server 910 of FIG. 7. Accordingly, the web application 22 and accompanying second session 28; in addition to the associated web services and APIs 78 of FIG. 2 may run on one or more web servers, as represented by the web server 910 of FIG. 7.

The back-end databases 70, 80 of the enterprise server system 48 and third party web application server system 72 of FIG. 2, respectively, may be implemented via the data storage device 930 of FIG. 7. Database management systems for facilitating access to the databases 70, 80 of FIG. 2 may run on the application server 920 of FIG. 7.

Furthermore, note that in certain embodiments, functionality of the business application 18 and the web application 22 of FIG. 2 may be spread between the web server 910 and the application server 920 of FIG. 7. In particular, the client system 46 of FIG. 2 may access the business application 18 and the web application 22 of FIG. 2 via websites that includes webpage code that calls one or more services and/or APIs, which in turn run or otherwise access or leverage the business application 18 and the web application 22, which in turn run on one or more application servers, as represented by the application server 920 of FIG. 7.

Furthermore, note that various embodiments discussed here may provide substantial benefits to software applications, e.g., the business application 18 of FIG. 2, by enabling the software applications to use or otherwise leverage or modify data and functionality of other web applications and associated sessions, without requiring modification of the web applications and associated sessions. Accordingly, without use of embodiments discussed herein, data and functionality usable by conventional cloud-based applications, e.g., web applications, was substantially limited by a dearth of efficient mechanisms for enabling sharing of a given computing session with other sessions of other applications.

FIG. 8 is a general block diagram of a computing device 500 usable to implement the embodiments described herein. While the computing device 500 of FIG. 8 may be described as performing one or more of the steps in the embodiments herein. In other embodiments, any suitable component or combination of components of the computing device 500 or any suitable processor or processors associated with system 500 may facilitate performing the steps.

FIG. 8 illustrates a block diagram of an example computing system 500, which may be used for implementations described herein. For example, computing system 500 may be used to implement server devices 910, 920 of FIG. 7 as well as to perform the method implementations described herein.

In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 8 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein address use of tokens to facilitate data access by a software application, embodiments are not limited to mere data access. For example, embodiments may employ use of tokens as discussed herein to facilitate writing data to a data store and/or accessing software functionality provided by the data store and/or provided by another software application that is configured to enable access to data and/or functionality in response to the supplying of credentials.

Note that embodiments for enabling access to functionality may readily be adapted and used with embodiments discussed therein that leverage an intermediate secure connector to selectively retrieve authentication information, e.g., account credentials, from a secure data store, in response to a supplied (by a software application) token or token name, to thereby enable access to the data and/or functionality by another software application, without departing from the scope of the present teachings.

Furthermore, while various embodiments are discussed herein within the context of cloud-based enterprise applications and third party web applications, embodiments are not limited thereto. Other types of applications and associated sessions may employ methods discussed herein to facilitate confidential data and/or functionality sharing, without departing from the scope of the present teachings.

Although the description has been described with respect to particular embodiments thereof, these particular embodiments are merely illustrative, and not restrictive. For example, while various embodiments discussed herein address use of a user session of a web application by another web application (e.g., could-based enterprise application) and associated session; not just a user of a browser accessing the web application via the first session, embodiments are not limited thereto. Systems and methods discussed herein may readily be extended to enable sharing of a given session (e.g., user session or other type of session) with plural other application sessions and/or user sessions, and vice versa (e.g., each of the plural application sessions and/or user sessions may also be selectively shared among each other and with the given session), without departing from the scope of the present teachings.

Furthermore, while various embodiments are discussed herein within the context of cloud-based enterprise applications and third party web applications, embodiments are not limited thereto. Other types of applications and associated sessions may employ methods discussed herein to facilitate session sharing, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating interaction between computing sessions, the method comprising:
    initiating a first session with a first application;
    providing interface information to the first application via the first session, wherein the interface information characterizes a second session with a second application;
    causing the first application to use the second application by employing the interface information that characterizes the second session of the second application in one or more messages transferred from the first application to the second application, wherein causing further includes:
        causing the first application to use functionality of the second application, wherein the functionality of the second application is accessed by the first application using the first session and the interface information that characterizes the second session of the second application, thereby causing a request message from the first session to the second session to appear to the second application as coming from the second session.

2. The method of claim 1, wherein the second application includes a web application, and wherein the method further includes:
    using the web application to selectively convey the interface information about the second session to at least one of the first and second sessions, including the first session, thereby enabling the at least one of the first and second sessions to act as part of the second session, and thereby enabling access to data and functionality of the web application by one or more external applications via the at least one of the first and second sessions.

3. The method of claim 1, wherein the first application includes a cloud-based enterprise application, and wherein the second application includes a web application that is external to the cloud-based enterprise application.

4. The method of claim 3, wherein initiating further includes:
    sending a first login request and first login credentials from a browser to the first application, the first application initiating the first session in response to the first login request and first login credentials.

5. The method of claim 1, wherein providing interface information further includes:
    sending a second login request and second login credentials from a browser to the second application, the second application initiating the second session in response to the second login request and second login credentials.

6. The method of claim 1, wherein providing interface information further includes:
    delivering, from a browser, information characterizing the second session, wherein the second session has been initiated via the browser via one or more request messages sent from the browser to the second application via the second session, wherein the information characterizing the second session includes the interface information.

7. The method of claim 6, further including:
    employing the browser to obtain the interface information, the interface information characterizing the second session, based on data exchanged between the browser and the second session after initiation of the second session.

8. The method of claim 6, wherein the interface information includes a portion of a session Uniform Resource Locator (URL).

9. The method of claim 8, wherein delivering further includes:

replicating one or more portions of the session URL to create one or more modified URLs; and employing the first session to use the one or more modified URLs to interface with the second session, thereby enabling the first session to act as part of the second session to use data or functionality of the second application via the second session.

10. The method of claim 1, wherein the second session includes a user session, and wherein the second session includes a session used by a cloud-based enterprise application, thereby augmenting data or functionality used by the second session through use of the first session.

11. A tangible processor-readable storage device including instructions executable by one or more processors for:

initiating a first session with a first application;

providing interface information to the first application via the first session, wherein the interface information characterizes a second session with a second application; and causing the first application to use the second application by employing the interface information that characterizes the second session of the second application in one or more messages transferred from the first application to the second application, wherein causing further includes:

causing the first application to use functionality of the second application, wherein the functionality of the second application is accessed by the first application using the first session and the interface information that characterizes the second session of the second application, thereby causing a request message from the first session to the second session to appear to the second application as coming from the second session.

12. The tangible processor-readable storage device of claim 11, wherein causing further includes:

using a web application to selectively convey the interface information about the second session to at least one of the first and second sessions, including the first session, thereby enabling at least one of the first and second sessions to act as part of the second session, and thereby enabling access to data and functionality of the web application by one or more external applications via the at least one of the first and second sessions.

13. The tangible processor-readable storage device of claim 12, wherein the first application includes a cloud-based enterprise application, and wherein the second application includes the web application that is external to the cloud-based enterprise application.

14. The tangible processor-readable storage device of claim 13, wherein initiating further includes:

sending a first login request and first login credentials from a browser to the first application, the first application initiating the first session in response to the first login request and first login credentials.

15. The tangible processor-readable storage device of claim 11, wherein providing interface information further includes:

sending a second login request and second login credentials from a browser to the second application, the second application initiating the second session in response to the second login request and second login credentials.

16. The tangible processor-readable storage device of claim 11, wherein providing interface information further includes:

delivering, from a browser, information characterizing the second session, wherein the second session has been initiated via the browser via one or more request messages sent from the browser to the second application via the second session.

17. The tangible processor-readable storage device of claim 16, further including:

employing the browser to obtain the interface information, the interface information characterizing the second session, based on data exchanged between the browser and the second session after initiation of the second session.

18. The tangible processor-readable storage device of claim 16, wherein the interface information includes a portion of a session Uniform Resource Locator (URL).

19. The tangible processor-readable storage device of claim 18, wherein delivering further includes:

replicating one or more portions of the session URL to create one or more modified URLs; and employing the first session to use the one or more modified URLs to interface with the second session, thereby enabling the first session to act as part of the second session to use data or functionality of second application via the second session.

20. An apparatus for facilitating interaction between computing sessions, the apparatus comprising:

one or more processors;

a tangible processor-readable storage device including instructions for:

initiating a first session with a first application;

providing interface information to the first application via the first session, wherein the interface information characterizes a second session with a second application; and causing the first application to use the second application by employing the interface information that characterizes the second session of the second application in one or more messages transferred from the first application to the second application, wherein causing further includes:

causing the first application to use functionality of the second application, wherein the functionality of the second application is accessed by the first application using the first session and the interface information that characterizes the second session of the second application, thereby causing a request message from the first session to the second session to appear to the second application as coming from the second session.

* * * * *